Sept. 11, 1962     J. H. LUIJERINK     3,053,667
PROCESS FOR THE PRESERVATION OF NON-HOMOGENEOUS MEAT
Filed Sept. 25, 1958                    2 Sheets-Sheet 1
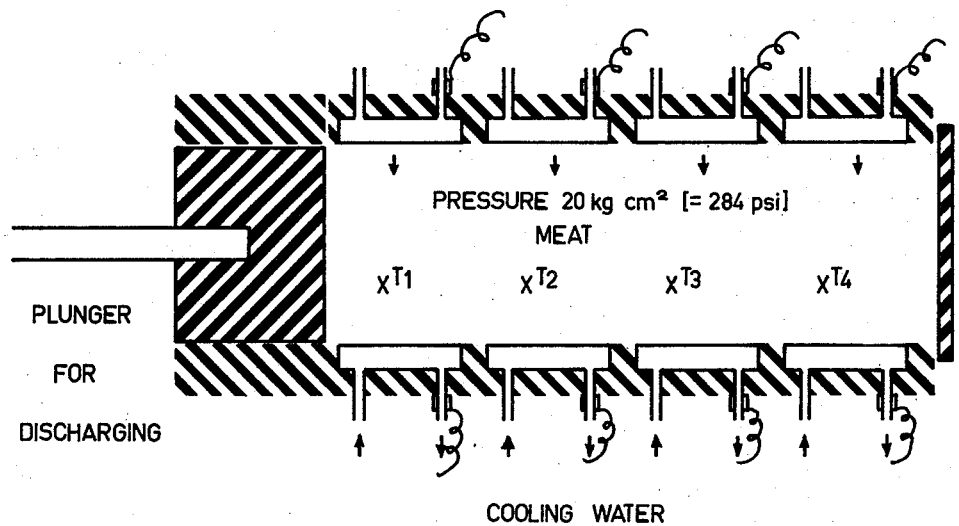
Inventor
Jan H. Luijerink
By Hugo E. Vlerbinger
Attorney

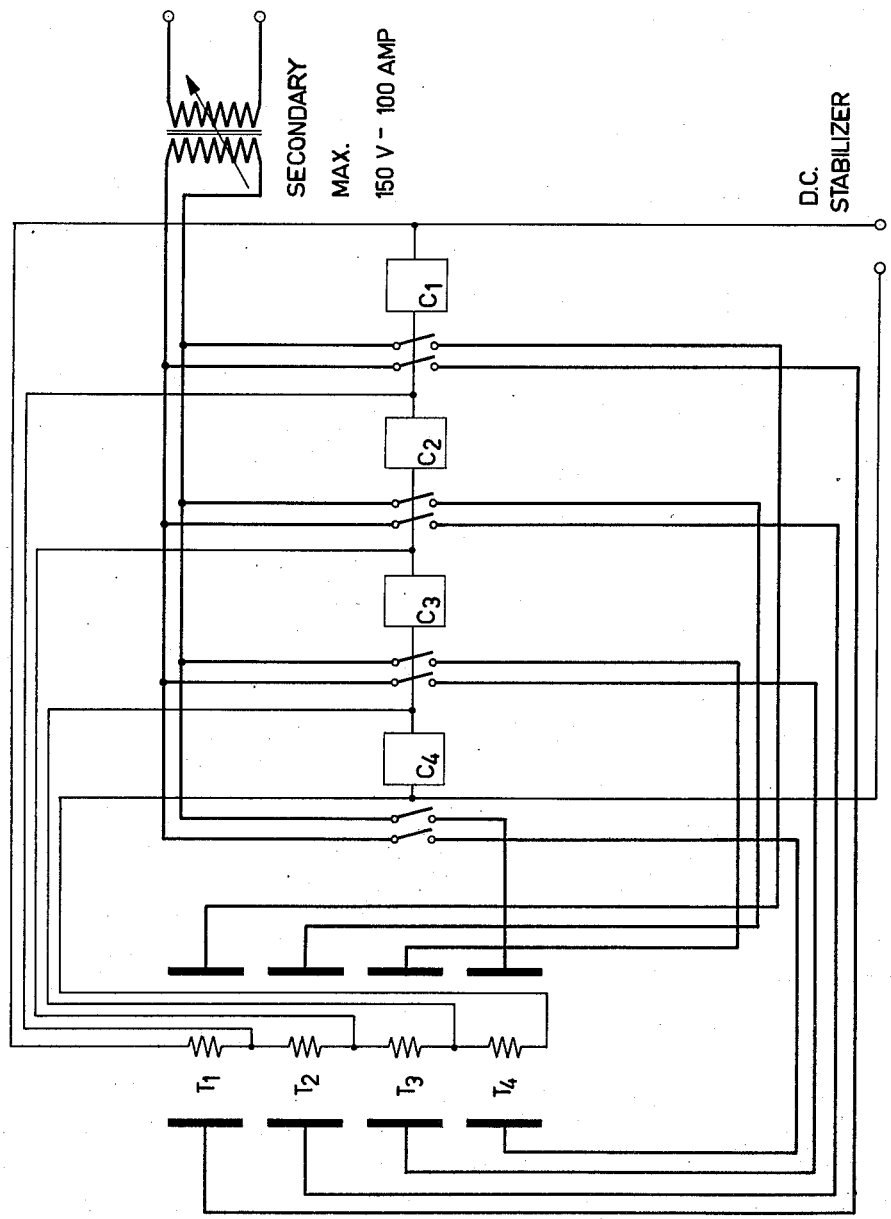

United States Patent Office 3,053,667
Patented Sept. 11, 1962

3,053,667
PROCESS FOR THE PRESERVATION OF NON-HOMOGENEOUS MEAT
Jan Hendrik Luijerink, Oss, Netherlands, assignor to Zwanenberg's Fabrieken N.V., Oss, Netherlands, a limited-liability company of the Netherlands
Filed Sept. 25, 1958, Ser. No. 763,420
Claims priority, application Netherlands Sept. 27, 1957
1 Claim. (Cl. 99—107)

The invention relates to a process for the preparation of preserved meat products.

The preservation of meat products is in general carried out by heating them at a temperature exceeding that of the pasteurization, as a result of which the bacteria present are killed. This heat can take place by means of a hot liquid or gaseous medium, such as hot water, hot air or steam. In general heating takes place after the meat products have been brought in the definitive packing.

In the preservation by means of heating, care should be taken that every part of the product to be preserved reaches the desired temperature and is kept at it for a sufficiently long time. In meat products of small dimensions this can be easily attained; the product is heated on the outside and after not too long a period of time the centre of the product, too, has reached the desired temperature owing to conduction. With larger pieces of meat, such for example as hams, however, the preservation will present difficulties. The heat-conductivity of the product is low, so that it will have to be heated externally at a high temperature for a very long time before the centre of the product has reached the desired temperature.

In pasteurization of a ham of a thickness of about 12 cm. by external heating, the central zone reaches the desired temperature only after 5–6 hours. Owing to the slow rise in temperature in this central zone the bacteria present have the oppostunity to breed when passing the temperature range favourable for their growth. The result is that the period of time during which this zone has to be maintained at the pasteurization temperature has to be prolonged. Because of the outer layers being exposed to high temperature heating for a longer time during pasteurization, the duration of pasteurization of the core will be chosen as shortly as possible. Even in that case the result of the pasteurization process gives little satisfaction, because the outer layers have deteriorated owing to the long heating, while much juice from the meat is lost. The quality of these layers—as far as consistency, colour, taste, and smell are concerned—has considerably deteriorated. Consequently, searches have long been carried out for better processes for the preservation of meat products. A solution for this problem is the application of dielectric heating, in which the meat mass is brought at temperature outside the ultimate packing by placing it in a high frequency magnetic or electric field (for example $9 \times 10^6$ cycles per second), see The National Provisioner 129, No. 7, 12–14 (1953). Although this method is very attractive, the technical problems involved in it have not yet been solved sufficiently to render application on a large scale possible.

Now a process was found for the preparation of preserved meat products, characterized in that the meat products are placed between one or more pairs of electrodes, after which the electrodes are charged with an alternating voltage until the products have reached the desired temperature by means of conduction, in which there is maintained a continuous contact between the products and the electrodes. Electric conduction through the products is possible by the water present in the meat mass and the salts dissolved therein. Use is made of alternating current because direct current would give rise to electrolysis of the salts present.

The preservation of homogeneous meat masses, such as minced meat, can be very well realized in this manner. The great advantage of the process is that the desired temperature in all the parts of the products is very rapidly reached.

On applying the process according to the invention to non-homogeneous meat masses, difficulties will present themselves because the conductivity of such masses is not everywhere equal. The result is that the current density is not everywhere equal, in consequence of which the heat development which, on equal terminal voltage, is proportionate to the current density, is larger in the parts with good conductivity than in the parts with less good conductivity. Notably, in the preservation of kinds of ham in which relatively large quantities of fat are present this non-homogeneity presents great difficulties. The fat which contains considerably less water than the meat has a far greater resistance than the rest of the mass. The result is that the temperature of the meat rises too high, while the fat does not reach the desired temperature.

Now it was found that these difficulties can be prevented by placing the meat products between several pairs of electrodes placed side by side to each other, after which the electrodes are charged with an alternating voltage which is controlled in such a manner that the power supply on each pair of electrodes is a function of the difference in temperature prevailing between the pair of electrodes and the average temperature prevailing between all the pairs of electrodes present, and to the effect that the power supply is highest on the pair of electrodes between which the lowest temperature prevails.

By this manner of preservation a regular heating is obtained also with non-homogeneous material. For, if between a pair of electrodes a large quantity of fat is present, less heat will be developed in the part lying between this pair than in those parts that contain less fat. The result is that the rise in temperature in this part lags behind that in the rest of the products. By means of the above control the power supply on the pairs of electrodes will alter in such a manner that the power supply on the electrodes belonging to this part exceeds that of the other electrodes, as a result of which the heat development in this part increases compared with the other pairs of electrodes. This will go on until the various parts have reached about equal temperatures again.

The control is carried out by inserting between each of the pairs of electrodes one or more thermometers in the meat products and controlling the power supply on the electrodes in accordance with the indicated temperature differences. In principle this control may be carried out by hand by for example reducing the terminal voltage on that pair of electrodes that causes the greatest development of heat. In practice the control of the terminal voltage on each pair of electrodes will be done automatically. As thermometers use may be made of thermo elements which, for example by means of electronic instruments, reduce or increase the voltage on the various pairs of electrodes according as the measured temperature differences give rise to it.

Preferably use will be made of resistance thermometers because with these the voltage on the pairs of electrodes can be altered, should it be necessary, in a simple manner, by means of servo motors which for example attend adjustable transformers.

A simple manner of controlling is obtained by regulating the alternating voltage on the electrodes in such a manner that the voltage on a pair of electrodes is temporarily reduced if the temperature of the meat products between that pair of electrodes is higher than that between a pair of electrodes lying side by side to it and that until these temperatures are equal.

The regulating mechanism is constructed preferably in such a manner that, after reaching the desired temperature between a pair of electrodes, it switches off the voltage on that pair.

The heating according to the process of the invention is effected before the meat products are brought in the definitive packing. For that purpose the products are pressed, by means of a press plunger, into a room of non-conducting material, in the walls of which the pairs of electrodes have been mounted.

An apparatus adapted to perform the process of this invention is depicted in the accompanying drawings wherein:

FIG. 1 is a schematic plan view of a pasteurization chamber for performing the process, and FIG. 2 is a diagrammatic layout of the electrical system, for furnishing current to the electrodes.

In FIG. 1 of the drawing the pasteurization chamber is shown schematically in longitudinal section. The chamber into which the meat is brought is bounded on the upper and lower sides by four pairs of plate electrodes. The upper electrodes are pressed against the meat at a pressure sufficient to insure good conduction of the electric current (e.g. about 20 kilos per sq. cm.) to the meat. On the left side the pasteurization chamber is bounded by a plunger for discharging the meat after pasteurization. On the right side there is a partition, which can be removed to allow the meat to be pushed out after treatment. The electrodes are hollow and a stream of cooling water can be made to pass through them, as indicated by the arrow near the lower electrodes. The cross-hatched portions are made of material which is a nonconductor of electric current. At the points marked X the temperature of the meat is measured during the pasteurization. The figures $T_1$ to $T_4$ inclusive indicate thermometer positions, at which the respective temperatures between electrode pairs are measured.

In FIG. 2 of the drawing the designations $C_1$, $C_2$, $C_3$ and $C_4$ refer to power supply control relays, each relay being connected with the resistance thermometer belonging to the pair of electrodes of which the relay regulates the power supply. After the products have reached the desired temperature, they are transferred into the definitive packing and post-pasteurized for some time, for example, in a hot-water bath. The bacteria present on the outside are then killed, while temperature differences, if any, in the products will be equalled by conduction. This post-pasteurization may last for example for 1 hour.

During the heating shrinkage of the products may occur, as a result of which the contact with the electrodes may be interrupted. The consequence may be that the parts of the meat products that have contact with the electrodes may be superheated. This can be prevented by cooling the electrodes for example with water, as a result of which that part of the product that is adjacent to the electrodes is only slightly heated. It is true, that part does not reach the pasteurization temperature then, but this is no objection because on post-pasteurization in the definitive packing it will certainly be brought at a sufficiently high temperature.

The occurrence of discolorations as a result of electrolytic phenomena can be prevented by lining the electrodes with a layer of platinum, by applying a porous intermediate layer, for example textile, impregnated with a solution of for example sodium chloride between the electrodes and the meat products or by making use of graphite electrodes.

The period of time within which the desired temperature is reached is dependent on the voltage which is applied to the electrodes. Preferably it will be chosen in the range of from 50–150 v.

The process according to the invention is preferably carried out in a press which is such that the meat products therein already obtain the shape of the definitive packing.

The process according to the invention is of special importance for the preservation of hams, because the preservation thereof presents most difficulties when done in the usual manner.

The following examples illustrate the invention.

*Example I*

A rectangular room has dimensions of 11 x 9 x 4 cm. The side walls are of non-conducting material, whereas the top and bottom walls (dimensions 9 x 11 cm.) are of stainless steel. These stainless steel walls form a pair of electrodes which can be connected with a source of current. One of the side walls of the room can be removed by means of a press. The room is filled with minced meat and the movable side wall is charged with a pressure of 50 kg. Subsequently the electrodes are loaded with an alternating voltage of 55 v. (Frequency 55 cycles per second.) After 38 seconds the temperature of the meat has risen from 15° to 90° C. Then the current is switched off, the meat mass is brought into a tin by means of the press which, after welding, is sterilized at a temperature of 120° C.

*Example II*

(A) 4420 g. of fresh, salted ham are brought into a rectangular press of non-conducting material. The dimensions of this press are 35 x 12 x 11 cm. On one side the block is closed with a press plunger. In the top and bottom sides of the press 3 pairs of stainless steel electrodes internally cooled with water and each having a surface of 11 x 8 cm. have been mounted. In one side wall of the press 3 holes have been made through which, after bringing in the ham, resistance thermometers are mounted and that in such a manner that between each pair of electrodes a thermometer is present. On the press plunger a pressure of 3 kg./cm.$^2$ is exerted. Subsequently a terminal voltage is charged on the electrodes of about 55 v. The effective strength of current per pair of electrodes amounts on an average to 15 A. The resistance thermometers have been coupled with a control mechanism for the terminal voltage of the electrodes. For this purpose the thermometers have been placed in a circuit in series, in which a source of current has been taken up. The voltage drop of each thermometer (resp. V1, V2, and V3) is a measure for the temperature between the matching pair of electrodes. The total voltage drop V$t$ of the 3 thermometers is a measure for the average temperature between the 3 pairs of electrodes. The voltage on each of the pairs of electrodes is regulated with a variable-ratio-transformer which is adjusted by means of a servo motor. The servo motor is in turn regulated by means of the thermometer belonging to the pair of electrodes and that in such a manner that the voltage applied to each pair of electrodes is a function of resp. V$t$—V1, V$t$—V2 and V$t$—V3, and that such the voltage of a pair of electrodes increases when the matching temperature is lower than the average temperature, and decreases when the matching temperature is higher than the average temperature. After 8 minutes the temperature of the ham has risen from 20° C. to 80° C. The left side wall of the press is then removed, after which the press plunger presses the contents into a tin. The tin is welded and placed in boiling water for 5 minutes. Subsequently post-pasteurization takes place by keeping the tin in a water bath of 70° C. for 1 hour.

During the heating in the press the temperatures prevailing between the various pairs of electrodes do not differ more than 30° C.

(B) In a manner analogous to that of Example IIA, a similar quantity of ham of equal quality is heated with the same apparatus. This time, however, a voltage of 55 v. is kept on each of the pairs of electrodes during the whole of the experiment. So, no use is made of the control mechanism which is coupled with the thermometers. After some minutes the indications of the 3 thermometers turn out to differ more than 40° C.

After canning and post-pasteurization the pasteurized ham of Example IIA is compared to that obtained according to Example IIB. It appears that, qualitatively, the former ham is considerably better than the latter; in the latter superheating during the treatment is clearly observable in several spots.

I claim:

Process for the pasteurization of non-homogeneous meat comprising heating said meat between at least two pairs of electrodes while maintaining direct contact between the meat and the electrodes, the electrodes being energized with alternating voltages in the range of about 50 to about 150 volts, until the meat has reached pasteurization temperature, whereby the power supply on each pair of electrodes is a function of the difference in temperature prevailing between that pair of electrodes and the average temperature prevailing between all the pairs of electrodes present, and to the effect that the power supply is highest on the pair of electrodes between which the lowest temperature prevails.

References Cited in the file of this patent

UNITED STATES PATENTS

| | | |
|---|---|---|
| 1,240,163 | Balazari | Sept. 18, 1917 |
| 1,900,573 | McArthur | Mar. 7, 1933 |
| 1,961,681 | Bohart | June 5, 1934 |
| 2,139,690 | McConnell et al | Dec. 13, 1938 |
| 2,438,184 | Pfister | Mar. 23, 1948 |
| 2,473,041 | Urbain et al. | June 14, 1949 |
| 2,474,390 | Aff | June 28, 1949 |
| 2,488,164 | Bowman | Nov. 15, 1949 |
| 2,488,165 | Bowman et al. | Nov. 15, 1949 |